Figure 1:
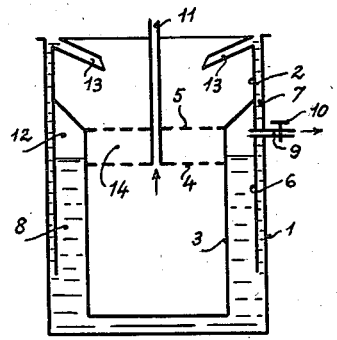

Jan. 12, 1937. L. M. POUGET 2,067,787
INFUSION APPARATUS
Filed June 29, 1934 2 Sheets-Sheet 1

Inventor,
Louis M. Pouget.
By William C. Linton.
Attorney.

Jan. 12, 1937.  L. M. POUGET  2,067,787
INFUSION APPARATUS
Filed June 29, 1934   2 Sheets-Sheet 2

Inventor,
Louis M. Pouget.
By William C. Linton.
Attorney.

Patented Jan. 12, 1937

2,067,787

UNITED STATES PATENT OFFICE 2,067,787

INFUSION APPARATUS

Louis Marcel Pouget, Paris, France

Application June 29, 1934, Serial No. 733,109
In Luxemburg June 30, 1933

5 Claims. (Cl. 53—3)

This invention relates to infusion apparatus. It is always recommended in order to obtain a good infusion of coffee to effect the be-sprinkling of the ground coffee only in successive small quantities of very hot water and to previously bring the said ground coffee to a certain temperature, the infusion thus obtained being then kept hot by means of a water bath.

On the other hand it is advantageous that the be-sprinkling of the ground coffee should be effected over the whole surface thereof and not at one point only.

Now, in known apparatus with a large output, the be-sprinkling is always continuous and generally speaking the ground coffee is drowned in a mass of hot water which arrives in too great a quantity.

The present invention therefore has for its object improvements in infusion apparatus generally and especially in coffee making apparatus having a large output, whereby the infusion of the coffee takes place under the conditions set forth above.

One of the chief characteristics of the coffee making apparatus according to the present invention resides first in an arrangement which permits of obtaining automatically the intermittent sprinkling of the ground coffee by means of small quantities of liquid and consists of a compression bell, the top of which serves as bearing surface for the hot air and steam formed above the water intended for the preparation of the infusion, in such a manner as to form a resilient bolster or mattress which serves to repel the hot water towards the top of the filter intermittently each time that the pressure of the bolster is sufficient to overcome the weight of the column of water to be raised above the edge of the filter.

A further characteristic of the invention resides also in the relation established between the surface of the compression bell and that of the water to be raised to the level of the edge of the filter in such a manner that the pulsations of hot water take place according to a determined cadence in ratio to the capacity of the filter itself.

An interesting feature also resides in the fact that the filter is situated at the centre of a cylindrical recipient containing the hot water for infusion which surrounds, by this fact, the filter in the form of a column of annular section and which overflows into the filter simultaneously over the whole periphery of the upper edge of this latter, the sprinkling thus taking place in a uniform manner over the entirely mass of ground coffee.

A characteristic feature resulting from the above mentioned arrangement consists in that the filter is maintained at a temperature which is practically equal to that of the sprinkling water.

A further feature also resides in that the water-tightness of the compression bell is ensured by the infusion water and by the annular liquid column which separates the bell from the free air.

Another characteristic consists in a discharge conduit for the air disposed in the bell to permit of reducing at will, the volume of the air bolster to a determined value in order to adjust the duration of heating necessary for the commencement of the ascent of the liquid, said discharge conduit being likewise usable as an overflow at the filling of the apparatus by allowing the escape of water as soon as it has reached the level at which it is disposed in the bell.

An important feature resides also in a safety device operating automatically and adapted to interrupt the heating of the apparatus as soon as the quantity of water adapted to serve for the making of the infusion has been used and this for the purpose of avoiding any passage of steam onto the ground coffee.

The method of withdrawing the infusion by siphon means passing through the hot zones of the apparatus also constitutes a feature of the invention, as well as the great ease of dismantling the apparatus for decrustation purposes.

Figure 3:
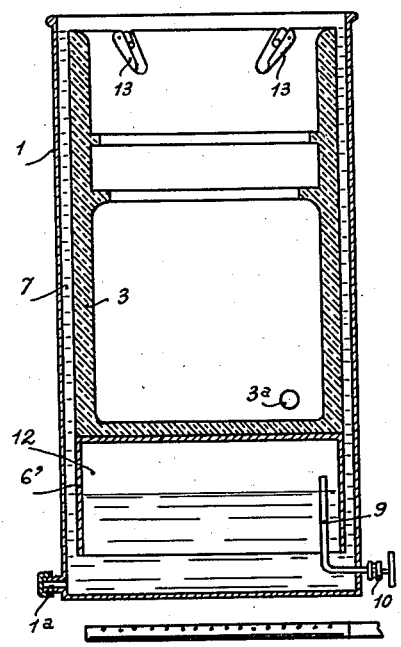
Figure 2:
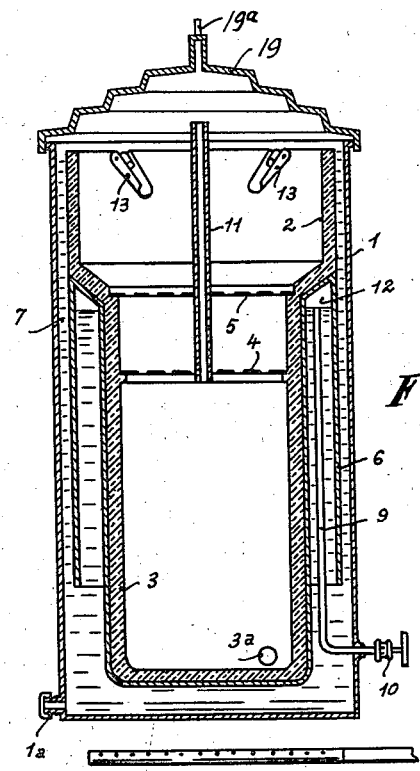
Figure 4:
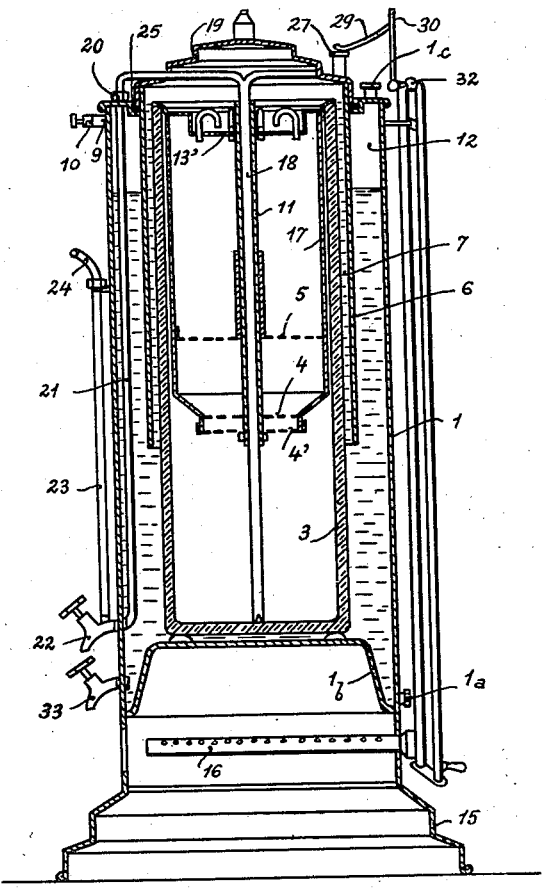
Figure 5:
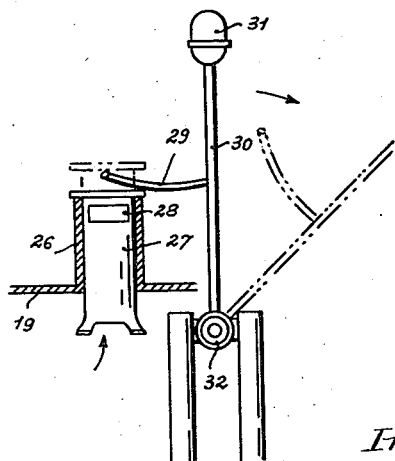

Finally, various other features of the invention will be apparent during a perusal of the following description. Reference being had to the accompanying drawings, which show:

Fig. 1 is a diagrammatic view of the principle on which the present invention is based;

Fig. 2 a constructional embodiment of a percolator shown in longitudinal section;

Fig. 3 a modified construction shown in section;

Fig. 4 a further modification shown in section;

Fig. 5 an automatic safety device.

The principle on which the apparatus works is as follows:

In a vessel 1 is disposed a filter comprising a recipient or bowl for hot water, said bowl being designated by 2, and a reservoir 3, the bowl and reservoir being separated from each other by a grid 4 and a counter-grid 5.

The walls of the bowl 2 are extended by a skirt portion 6 leaving a comparatively small space 7 between them and the vessel 1.

The diameter of the reservoir 3 is smaller than that of the bowl 2 and consequently of the skirt portion 6, and thereby provides an annular space 8 forming the bell.

The bell 8 communicates with the external air by means of a pipe 9 closed by a cock 10. This pipe is disposed at a pre-determined height in the bell.

On the other hand the reservoir 3 is placed in communication with the external air by means of a pipe 11.

The operation of the device is as follows:

The vessel 1 is filled through a suitable place into the space 7 and it will be understood that if the cock 10 is closed the water will be unable to rise in the bell 8 more than a small distance, a bolster or mattress of air 12 being reserved in the bell.

The volume of this bolster of air can be brought to a determined value by means of the cock 10 which need only be opened to allow the air to escape from the bell and be closed to retain a cushion of air of desired value. This cushion of air can no longer communicate with the outside, the water surrounding the bell forming a hydraulic joint or seal.

As soon as the vessel 1 is heated the temperature of the water rises and the dilation of the air or steam formed takes place driving out a certain quantity of water into the bowl 2.

Immediately after the decompression thus produced, stability occurs between the weight of the annular liquid column 7 and the pressure reigning at 12 so that no more water runs into the bowl 2.

A little time for heating is necessary so that the pressure increasing in 12 causes a fresh overflow and the same occurs for all infusions occurring by intermittent pulsations, the frequency of which depends on the heating temperature and on the dimensions of the spaces 8 and 7.

The end of the infusion will correspond with the moment at which the steam contained in the space 12 escapes into the space 7 and a sudden push in passing over the lower edge of the skirt 6.

On the other hand, it will be clear that the greater the volume of the air or steam cushion 12 may be, the less will the water be raised under the bell and that this volume of water will become hot more quickly. In this case, the air contained in 12 will become hot rapidly also and will bring about in a very short time the overflow of water into the bowl 2.

On the contrary, if the volume of the air cushion is much reduced the mass of water to be heated is greater and the air will take longer to exert its resilient effect.

In both cases the steam liberated will tend to increase the volume of the air cushion and also the pressure exerted on the water.

It follows that by an appropriate adjustment of the volume of the air cushion the overflow for a determined temperature can be obtained. This adjustment can be obtained once and for all for the best conditions of infusion by disposing the orifices of the tube 9 at a suitable height beneath the bell 6.

It is then sufficient to open the cock 10 at the moment of filling the vessel 1 and to close it only at the moment when the water, reaching up to the orifice of tube 9 in the bell, discharges through the cock. The air cushion 12 is thus limited to a determined value, without any necessity of experimenting by the user, the adjustment of the position of the tube having been determined by the manufacturer.

The filling operation is carried out until the water reaches practically the upper edge of the bowl 2.

It should also be observed that during the operation or working of the apparatus, the water flows over into the bowl 2 peripherally and in this way uniform distribution onto the ground coffee is obtained.

If however it is desired to obtain perfect distribution gutters 13 or the like may be disposed in the wall of the bowl 2 in order to bring a certain quantity of water for infusion into a more central part of the filter. The water then overflows simultaneously onto the whole of the aromatic compress (coffee or other substance), disposed at 14 between the grids 4 and 5.

On the other hand, the water flowing over onto the filter 4—5 cannot pass through the aromatic material unless the air in the reservoir 3 can escape. By suitably calibrating the section of the tube 11, it is possible to adjust the outflow speed of the water and consequently the speed of filtration, the aromatic material forming a tight joint.

In practice the apparatus can obviously be given various shapes.

Thus in the form of a construction shown by way of simple example at Fig. 2, the vessel 1 consists of a metal body receiving internally an earthenware, porcelain, glass or other recipient forming the bowl 2 and the reservoir 3.

Shoulder pieces formed during the manufacture of said recipient, serve as bearing members for two grids 4, 5.

These latter are traversed by the tube 11 ending at the upper part of the filter.

Around the earthenware or like reservoir 3 is disposed a sleeve 6 of metal, porcelain, enamel, earthenware and so on forming the bell 12 of the diagrammatic representation previously mentioned. Gutters 13 are secured to the bowl 2 and are articulated in such a manner as to permit the removal of the grids 4 and 5.

In the bell 12 is disposed a tube 9 which is brought back towards the bottom to the cock 10 for the evacuation of the air and water in excess in the bell. The orifice of the tube 9 is disposed in the bell at a suitably determined height as has been explained hereinbefore.

It may be mentioned that the arrangement of the air bell can be quite different to that diagrammatically shown in Figure 1, and chosen for the first form of construction depicted in Figure 2. In fact it is possible to arrange it in a quite different manner as for instance below the recipient 3. Thus in a further form of construction such as shown in Figure 3, the recipient is of earthenware, porcelain or other material 2—3 surmounting a base 6' of metal, earthenware, enamel and so on for forming the air bell.

The external diameter of the recipient 2—3 is then uniform and the space 7 is reserved between the walls of the vessel 1 and said recipient as in the drawings illustrating the underlying principle of the invention.

The tube 9 is disposed in the bell as in the previous form of construction, but it may have its discharge outlet at the top of the apparatus.

The gutters 13 can be carried by the grid 5 of the filter and be disposed under small chutes formed in the earthenware of the bowl 2 at a suitable height.

The apparatus has a further advantage namely that of serving as a water bath for heating the finished infusion contained in the reservoir. It is sufficient, in this case, to keep the cock 10, serving for the evacuation of air and steam produced in the bell, open. By so producing a decompression permanently in the bell, no pressure is exerted on the liquid which therefore does not rise up to the gutters.

Finally in another form of construction as shown in Fig. 4 the boiling vessel 1 of cylindrical form is mounted on a base 15 housing heating means 16 such as a gas burner, in the case under consideration.

The bottom 1b of the vessel 1 is strongly curved to provide a greater heating surface for the water contained in the vessel.

An orifice 1c is used for the filling of the vessel and another orifice 1a is used for its emptying.

Inside the vessel 1 is disposed a skirt portion 6 soldered or otherwise secured to the upper part on a bead of the vessel 1 and depending only a certain amount within the latter.

Finally, inside said skirt portion is arranged the filter itself comprising a recipient of earthenware or the like marked 3 in which is disposed a basket 17 closed at its base by two grids 4 and 4' which are removable. A pressing grid 5 completes this filter.

The basket is traversed by a tube 11 destined to allow passage for the air driven out by the infused liquid falling in the recipient 3.

A conduit 9 determinated by a cock 10 permits the air contained in the vessel 1 to escape at the filling of the latter and to regulate in this manner the cushion of air which it is desired to create in the annular space formed between the wall of the vessel 1 and the skirt portion 6 when the water rises in the said space.

The operation of all these apparatus is identical and strictly conforms with the theoretical operation described previously herein.

All the apparatus can function under atmospheric conditions but it is obvious that they can be supplied with a lid to better retain the heat of the entire apparatus.

It is even possible to make use of a particular feature of the apparatus to actuate an automatic safety device. In fact, as already stated hereinbefore, the operation of the apparatus stops as soon as the steam can escape suddenly from the space 12 by passing beneath the edge of the skirt portion 6, that is to say when the water has fallen below this level. In order to utilize this decompression which is pretty sudden, the vessel 1 can, as will be seen in Figure 4 by way of example, be provided with a lid 19 secured to it by a screw, bolt or other locking means acting on a water-tight joint 25.

On the lid is disposed a pipe 26 (Fig. 5) in which can slide a hollow cork or plug 27 pierced with an opening 28. Above said cork is disposed an arm 29 forming part of a rod 30 provided with a weight 31 and mounted on the cock casing 32 for the gas feeding means to the gas burner 16 destined for heating the apparatus. The whole is mounted in such a manner that the rising of the cork or plug 27 causes the rod 30 to be pushed back and as the same falls, carried along by its weight 31, it simultaneously closes the cock 32.

It is therefore easily understood that the sudden expansion of steam in the apparatus lifts the plug 27 which allows the escape of steam through the orifice 28. But at the same time, the plug in lifting will cause the fall of the rod 30 and consequently the closure of the cock 32. The heating means will therefore be simultaneously interrupted or by-passed.

It is obvious that the heating can be by electricity or other means and that the safety device 30—32 can be readily adapted to such form of heating.

The withdrawal of the infusion may be carried out in a number of ways.

It can be effected through an orifice 3a situated at the base of the reservoir 3 (Fig. 2). The withdrawal cock can also serve at the same time as fixing means for the reservoir and of the sleeve in the vessel 1.

It is also possible to withdraw the infusion liquid preferably by siphon means formed as shown in Figure 4.

In this form of construction the tube 11 is traversed by a tube 18 reaching to the bottom of the recipient 3 and rising to the cover 19 through which it passes to join up through a union 20, with piping 21 disposed inside the vessel. This piping protrudes at the exterior of the vessel and ends in a draw-off cock 22.

Above this cock is mounted a level 23 the upper part of which is prolonged by a pipe 24 through which air can be drawn which is contained in the pipes 21 and 18 in order to start up the siphon which they form. This suction can be effected by a bulb, resilient trumpet or any other removable apparatus or provided with a cock which permits the bringing of the levelling tube 23 in communication with the free air so that after starting up the siphon action, the liquid can take up its level in said tube.

It will be seen that the tube 18—21 traverses a zone which is always kept hot.

An orifice 1a is provided at the base of the entire apparatus for emptying it and a cock 33 can be fitted for withdrawing of very hot water for infusion purposes (tea, camomile, lime and so on).

The recipient 3, constantly kept at water bath heat, can be made partly of earthenware and partly of metal or in any other suitable manner.

What I claim is:

1. A coffee urn comprising a vessel, a coffee compartment suspended therein and in spaced relation to provide a passageway therebetween, a cylindrical partition arranged within said passage and having its lower end opened, a cover for said vessel closing the upper end of said coffee compartment, a siphon pipe having one end projecting down within said coffee compartment, a portion of said siphon pipe extending through said passageway and a valve arranged externally of said vessel and connected to the opposite end of said siphon pipe.

2. A coffee urn comprising a cylindrical vessel, a receptacle suspended therein and arranged concentrically thereto providing a passageway therebetween, a cylindrical flange projecting about said receptacle providing an air space communicating with the interior of said vessel, said receptacle comprising a bowl portion, a reservoir formed with and communicating with said bowl portion, a pair of spaced coffee retaining grids arranged between said bowl portion and reservoir of said receptacle, gutters arranged upon said bowl portion and communicating with the passageway between said vessel and receptacle.

3. A coffee urn comprising in combination a vessel containing water to be heated, a heater arranged below said vessel, a supply source for said heater, a control valve for said supply source of said heater, a coffee containing receptacle suspended within the water contained in said vessel, the upper end of said vessel and receptacle being opened, a flange arranged between said vessel and receptacle having its lower end opened thereby forming an air space therein, means controlled through the dilations of the air contained in said air space for actuating said control valve whereby the heat generated by said heater may be regulated, and a cover for said vessel for closing the upper opened ends of said vessel and receptacle.

4. An infusion apparatus comprising a vessel containing heated water, a receptacle suspended within the heated water contained within said vessel, a coffee basket suspended within said receptacle, an open ended flange projecting within the heated water contained in said vessel whereby an air space will be established therein, means of communication between the upper end of said receptacle and said vessel whereby the heated water contained in the latter may percolate within said receptacle, a cover for closing the upper end of said vessel and receptacle, an opening in said cover, a vent pipe extending through the coffee basket and one end of said vent pipe terminating within said receptacle.

5. An infusion apparatus comprising a vessel containing water to be heated, a receptacle suspended within the water contained within the vessel and arranged concentrically thereto in spaced relation to provide a passageway therebetween, a flange extending within said passageway so formed and arranged in spaced relation to said vessel and receptacle and having its lower extremity immerged in the water contained in said receptacle, the upper end of said flange being closed so as to provide an air space communicating with the interior of said vessel, a coffee basket suspended within said receptacle, means of communication between said vessel and receptacle whereby the water contained in the vessel may be caused to percolate within the receptacle and be distributed over the coffee basket suspended therein, a vent tube carried by said coffee basket for venting said receptacle whereby filtration through said coffee basket will be enhanced.

LOUIS MARCEL POUGET.